United States Patent Office 3,060,229
Patented Oct. 23, 1962

3,060,229
PROCESS FOR THE PRODUCTION OF VITAMIN-A-COMPOUNDS
Karl Eiter, Koln-Stammheim, and Ernst Truscheit, Leverkusen, Germany, assignors to Farbenfabriken Bayer Aktiengesellschaft, Leverkusen, Germany, a corporation of Germany
No Drawing. Filed Dec. 12, 1960, Ser. No. 75,105
Claims priority, application Germany Dec. 21, 1959
2 Claims. (Cl. 260—488)

Process for the production of vitamin-A-alcohol or its esters which during synthesis do not pass through the stage of the corresponding aldehyde have been described several times in the literature. The most important of these processes employ certain reaction procedures for the construction of the $C_{20}$-molecule whereby allyl rearrangements, which are undesirable during the course of synthesis and which eventually give products entirely without biological activity, are avoided by the introduction of blocking groups (e.g. the methylene group in the compound known as $\beta$-$C_{14}$-aldehyde).

Synthesis of the $C_{20}$-molecule can, however, also be carried out via reaction procedures whereby in theory no allyl rearrangements occur, as is the case, e.g., during the ylide-synthesis. Both methods of operation leading to results in this case, and a series of other reactions which have been disclosed, systematically avoid the methods of synthesis first discovered in the chemistry of vitamin A and very readily applied in technology for the attainment of a "normal conjugated system," whereby simpler carbonyl compounds of the vitamin A series, such as $\beta$-cyclocitral, $\beta$-ionone, $\beta$-$C_{15}$-aldehyde, $\beta$-$C_{18}$-ketone, etc. are converted to hydroxylated intermediate compounds by means of organometallic reactions. The reason for this is due to the fact that elimination of water from such hydroxylated intermediate products by manifold allyl rearrangement essentially produces compounds of the series known as "retro-series" which yield biologically inactive compounds during further synthesis.

It must also be pointed out that a number of older papers and patent applications, wherein the mechanism of the rearrangement known as "retro-rearrangement" had not been clearly recognised, described the production of Vitamin-A-compounds alleged to have the correct conjugated system of double bonds. Experimental repetition of the work has, however, shown that the resulting compounds are really retro-compounds and are biologically inactive (for details, cf., e.g., H. O. Huismann, Recueil des Travaux chimiques des Pays-Bas 71, 911 (1952)).

Therefore, no syntheses are yet known in the Vitamin A field which make use of the normal organometallic reaction, such as Grignard or Reformatsky reactions, and which, via hydroxylated intermediate products with the hydroxyl group in the allyl position—optionally via a system of conjugated double bonds—to the double bond of the cyclohexene ring, directly produces compounds with the normal conjugated system. Such processes would render unnecessary the use of blocking groups and of back-isomerisations, and constitute an important technical advance.

(1)
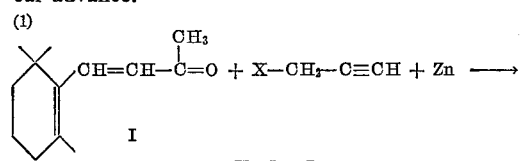

X=Br, I

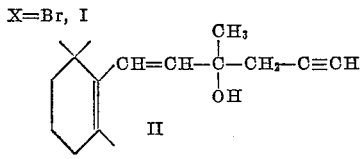

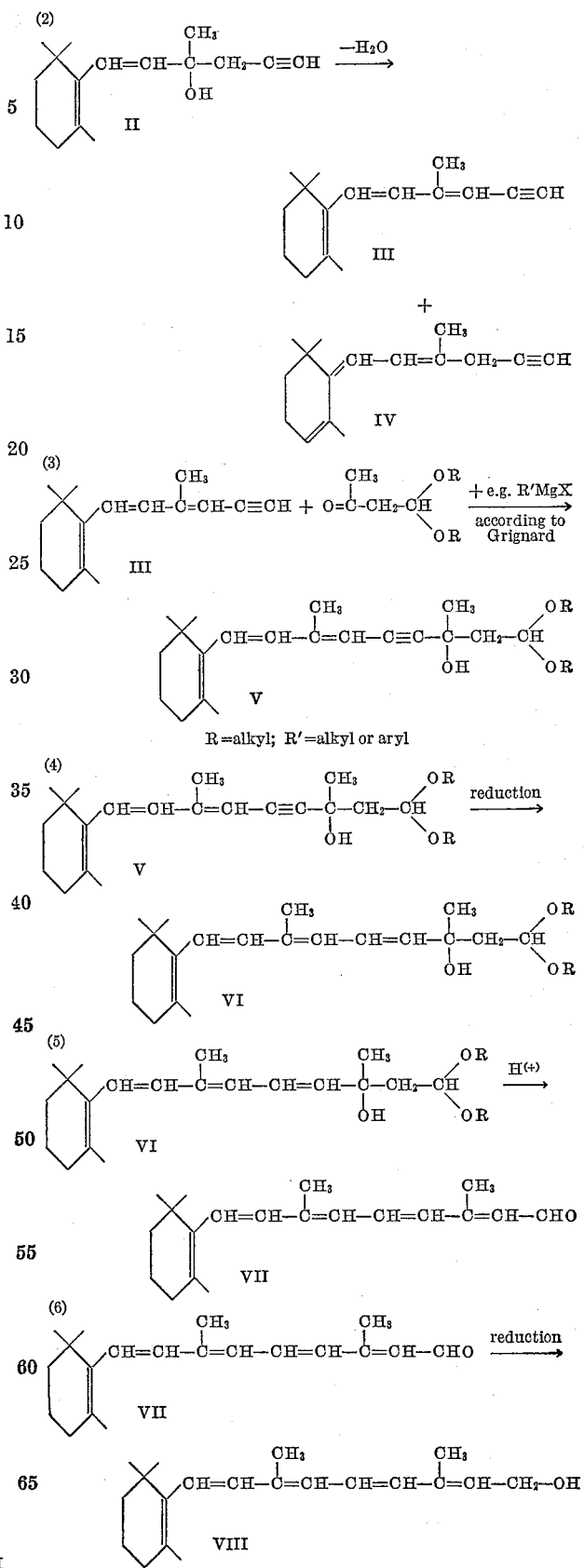

In the following, a description is now given of a process which permits the synthesis of vitamin-A-aldehyde in 5 reaction steps with avoidance of blocking groups and back-isomerisations; in a sixth reaction step, it can be reduced to vitamin-A-alcohol, if desired (cf. the above scheme). The process consists in that during the first step β-ionone (I) is reacted with propargyl halides and zinc to give the acetylene carbinol (II), during the second stage water is eliminated from this acetylene carbinol (II) by inorganic acid halides in the presence of tertiary organic bases, and if desired the isomer (IV) belonging to the series known as the retro-series and obtained in minor amounts as the side-product is separated from the reaction product which in the main consists of the acetylene hydrocarbon (III), during the third stage the acetylene hydrocarbon (III) is converted to the β-hydroxyacetal (V) by organometallic reaction with 1,1-dialkoxybutanone-(3), during the fourth stage the β-hydroxyacetal (V) is partially hydrogenated at the C≡C triple bond to the compound VI in known manner by complex metal hydrides or catalytically, during the fifth stage the β-hydroxyacetal (VI) is converted to the vitamin-A-aldehyde (VII) by treatment with acidic reagents in an organic medium, during the sixth stage the vitamin-A-aldehyde (VII) is reduced in known manner to the vitamin-A-alcohol, and this is optionally esterified to a vitamin-A-ester, also by a known method. It is also possible to carry out several stages of the synthesis in a single process.

A process has thereby been found which makes use of the advantageous organometallic synthesis for the synthesis of vitamin A. Although hydroxylated products occur as intermediate compounds during such syntheses, their hydroxyl group being located via a system of conjugated double bonds in the allyl position to the double bond of the cyclohexene ring, compounds with the correct conjugated system of double bonds are nevertheless directly obtained. This result is attainable by the use, in the third stage of the process according to the invention, of 1,1-dialkoxy-butanone-(3) as reaction component, and the β-hydroxyacetals (V and VI) are thereby obtained. The special structure of the β-hydroxyacetal (VI) makes possible elimination of water whilst avoiding a retro-rearrangement and also the splitting off of the protecting acetal grouping to the free aldehyde (VII) in a single operation step. The reaction steps 1, 3, 4, and 6 are partly known, and partly the subject of previous proposals, so that in this respect, protection is only sought for the steps 2 and 5.

(1) In the first step, β-ionone (I) is reacted with a propargyl halide and zinc to give the acetylene carbinol (II).

This reaction has in essence already been described in Swiss patent specification 258,514 and German patent specification 1,028,118.

The Swiss patent specification states that the reaction only proceeds to an incomplete extent, and that the unconverted β-ionone has to be separated by a complicated method with semicarbazide since separation of β-ionone is impossible by distillation. Hence, this process is excluded for technical production.

The process according to the German patent specification only differs from the first one in that β-ionone is not used at a deficiency, but rather at a slight excess, referred to the employed propargyl halide. Despite this fact, practically complete conversion is said to be achieved under the conditions there specified. Our own investigations have however indicated that even under these circumstances, no better results are attained than according to the statements of the mentioned Swiss patent.

However, further investigation of this reaction has now shown that β-ionone (I) can be quantitatively converted to give the compound II with propargyl bromide or iodide and zinc, when the employed zinc is present in the form of zinc dust, preferably surface-activated with dilute hydrochloric acid, and when a mixture of absolute ether and absolute tetrahydrofuran in the proportion of about 1:1 is employed as solvent, whereby a total of 300–600 ml. of solvent mixture is applied in the reaction per mole of employed β-ionone. The evidence for complete conversion to the compound II is found, inter alia, in the lack of the carbonyl bond in the infrared spectrum of the reaction product.

To avoid resinous side-products, it is desirable to carry out this reaction step in an atmosphere of inert gas, and to add 0.1–1% of an antioxidant, referred to the employed β-ionone, to the reaction mixture. For this purpose, consideration can be given to, e.g., hydroquinone, α-tocopherol acetote, or phenothiazone. To carry out this reaction step, use is made of 1.1–1.4 moles of propargyl halide per mole of β-ionone, and correspondingly of 1.1–1.4 gram atoms of zinc dust which has been surface-activated with dilute hydrochloric acid, washed with water, ethanol, acetone, and ether, and then dried in vacuo at 80–100° C., as well as of 300–600 ml., preferably 400 ml., of a mixture of absolute ether and absolute tetrahydrofuran in the proportion of about 1:1.

According to one of the methods of carrying out this reaction step, the freshly activated zinc dust is first admitted together with the β-ionone, 0.1–1% of antioxidant, and about half of the solvent mixture to be employed. About ⅒ of the required propargyl halide, preferably propargyl bromide, dissolved in the remainder of the solvent mixture is allowed to run into the first admitted reaction components, the reaction mixture is then warmed with stirring in an atmosphere of inert gas until the reaction starts, and the remainder of the solution containing the propargyl halide is then allowed to run in, with stirring and without external heating, so that the reaction mixture boils moderately. The temperature range of 40–65° C. attained with the solvent mixture preferably employed for the reaction has proved to be an optimum, since at higher temperatures, too much resin formation and at lower temperatures, incomplete conversions occur.

To complete the reaction, the reaction mixture is still stirred for 15–20 minutes after all the propargyl halide has been added. Thereupon, the cooled reaction product is decomposed with an aqueous solution of ammonium chloride or with aqueous inorganic acids, such as dilute sulphuric acid, hydrochloric acid, or with organic acids such as acetic acid, tartaric acid, oxalic acid, and the reaction product is isolated by the usual methods. For special purification, the resulting acetylene carbinol (II) can be distilled in a molecular thin layer evaporator.

According to the other method of carrying out this stage of reaction, only the freshly activated zinc dust is first admitted, and into this are then run about ⅒ to ⅕ of the mixture of the remaining reaction components, the antioxidant, and the solvent mixture. It is then warmed, with stirring, in an atmosphere of inert gas, until the reaction starts, and the remainder of the above mentioned mixture is then allowed to run in without external heating so that the reaction mixture boils moderately. Otherwise, the procedure is as for the first method of carrying out the process.

(2) During the second step, water is eliminated from the acetylene carbinol (II), whereby the normal conjugated $C_{16}$-hydrocarbon III is mainly formed, apart from small amounts of an isomeric compound (IV) which belongs to the series known as the retro-series.

Attempts at eliminating water from the acetylene carbinol (II) have already been described in the literature. Thus, e.g., O. Isler (Chimia, vol. 3, 1949, page 150; vol. 4, 1950, page 115) has employed p-toluene-sulphonic acid as water-eliminating agent, and isolated a hydrocarbon $C_{16}H_{22}$ of melting point 51–52° C. The same hydrocarbon $C_{16}H_{22}$ has been obtained by H. H. Inhoffen and collaborators (Annalen der Chemie 569, 79–80 (1950)) from compound II during elimination of water with anhydrous oxalic acid. Both authors mistakenly ascribed the constitution III to the compound. However, in fact it should have the constitution IV, as is explained later in detail below.

It has now been found that a liquid hydrocarbon $C_{16}H_{22}$ of the constitution III and only very little of the crystalline hydrocarbon $C_{16}H_{22}$ of melting point 51° C. with the constitution IV are obtained during elimination of water from the acetylene carbinol (II) when inorganic acid halides are employed for the elimination of water, and the procedure is carried out in the presence of tertiary organic bases.

The constitution of the liquid hydrocarbons clearly follows, e.g., from the infrared spectrum which shows the band at 2080 c.$^{-1}$ characteristic for the $\alpha,\beta$-unsaturated $C\equiv C$ bond as well as adsorption at 965 cm.$^{-1}$ characteristic for the symmetrically disubstituted

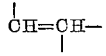

trans-ethylene bond. However, these two bands characteristic for the normal conjugated system of constitution III are missing from the infrared spectrum of the crystalline hydrocarbon of melting point 51° C. Instead, the infrared spectrum exhibits a band at 2120 cm.$^{-1}$ which is characteristic for the $\alpha,\beta$-saturated $C\equiv C$ bond. From this, it is now clearly evident that the constitution IV of a retro-$C_{16}$ hydrocarbon should be accorded to the crystalline hydrocarbon $C_{16}H_{22}$ and the constitution III with the normal conjugated system to the liquid hydrocarbon $C_{16}H_{22}$.

To carry out the second reaction step, the acetylene carbinol (II) is dissolved in an inert solvent, such as benzene, toluene, carbon tetrachloride, high boiling petroleum ether, or in mixtures of these solvents. 400–600 ml., preferably about 500 ml., of solvent, are employed per mole of acetylene carbinol (II). After addition of 0.1–0.5% of antioxidant such as hydroquinone, $\alpha$-tocopherol acetate, phenothiazine, referred to the employed compound II, and of 2–4 moles, preferably 3 moles, of a tertiary organic base, such as pyridine, quinoline, diethylaniline, N-phenylmorpholine, or triethylamine, 1–2 moles, preferably 1.5 moles, of an inorganic acid halide, such as phosphorus pentachloride, phosphorus trichloride, phosphorus tribromide, phosphorus oxychloride, thionyl chloride, or preferably arsenic trichloride dissolved in 300–500 ml., preferably 400 ml., of the employed solvent are allowed to run into the solution thus prepared, whilst stirring in an atmosphere of inert gas. When everything has been added, the reaction mixture is heated to 60–120° C., preferably to 80–100° C., for 1–3, preferably 2 hours.

After working up, the reaction mixture is decomposed with ice water. The separated organic phase is shaken with dilute acids to remove basic constituents, washed till neutral, dried, and freed from solvent.

When arsenic trichloride is employed as agent for the elimination of water, it has proved desirable to free the reaction mixture first from solid substances through filtering by suction, to wash the filter cake with an organic solvent, and to decompose the liquid phase with ice water and to work it up further as described above. The reaction product thus obtained can be purified by distillation in a molecular thin layer evaporator at $10^{-3}$ mm. Hg and 100–110° C.

To separate small amounts of the retro-hydrocarbon IV, the reaction product is dissolved in about an equal volume of a non-polar organic solvent, preferably petroleum ether, and the crystalline portions are quantitatively frozen out at temperatures below 0° C. Thus, the pure hydrocarbon $C_{12}H_{22}$ of constitution III is obtained in the mother liquor.

(3) In the third synthesis step, the $\beta$-hydroxyacetal (V) is prepared from the acetylene-hydrocarbon III and 1,1-dialkoxybutanone-(3).

This conversion is carried out so that the previously unknown compound V is obtained with the particular structure of a $\beta$-hydroxyacetal, in that the acetylene hydrocarbon (III) is reacted with 1,1-dialkoxybutanone-(3) by an organometallic reaction.

The following two methods of execution have proved to be especially favourable:

According to the first method of carrying out this stage of reaction, the acetylene hydrocarbon (III) is reacted by the usual method with 1.2–1.5 moles, preferably 1.3 moles, of alkyl- or aryl-magnesium halide or alkyl- or aryl-lithium; 1.3–1.7 moles, preferably about 1.5 moles of 1,1-dialkoxybutanone-(3) per mole of acetylene hydrocarbon (III) are introduced with very vigorous stirring at temperatures of minus 10–plus 20° C., preferably at 0° C., into the solution of the organometallic compound from III thus obtained during 1–4 hours, preferably during about 2 hours. To complete the reaction, the reaction mixture is still stirred at room temperature for another 6–12 hours. To isolate the $\beta$-hydroxyacetal (V), the reaction mixture is decomposed as usual, e.g. with a cold aqueous solution of ammonium chloride. The $\beta$-hydroxyacetal (V) thus obtained can directly be subjected to further processing. To purify by refining, it can be distilled in a molecular thin layer evaporator at $10^{-3}$ mm. Hg and 160° C.

According to the other method of carrying out this reaction step, the organo-lithium compound of the acetylene hydrocarbon (III) is obtained by the usual method from the compound III by reaction with lithium in liquid ammonia, and this is reacted with 1,1-dialkoxy-butanone-(3) in the same medium to give the $\beta$-hydroxyacetal (V).

(4) In the fourth synthesis step, the $\beta$-acetylene-hydroxyacetal (V) is partially hydrogenated at the $C\equiv C$ bond with complex metal hydrides or catalytically. This partial hydrogenation can be carried out according to known methods (see, e.g., N. G. Gaylord: Reduction with Complex Metal Hydrides, page 968 (1956) and O. Isler et al., Helvetica chimica acta 30 (1947), page 1911).

By preference, the following methods of execution are employed:

In one of the methods of carrying out this reaction step, an alkali or alkaline earth aluminium hydride, such as, e.g., lithium aluminium hydride, magnesium aluminium hydride, calcium aluminium hydride in an inert organic solvent, such as diethyl ether, also in admixture with tetrahydrofuran, dioxane, or benzene, is employed as the complex metal hydride.

The hydrogenation is carried out so that at minus 10–0° C., a solution of 1 mole of the acetylene-hydroxyacetal (V) in 300–500 ml., preferably about 400 ml., of inert solvent is allowed to run with stirring in an atmosphere of an inert gas into a solution of 0.6–1.1, preferably about 0.9, moles of complex alkali or alkaline earth metal hydride, preferably lithium aluminium hydride, or of 0.3–0.6, preferably about 0.5, moles of complex alkaline earth aluminium hydride in 300–500 ml., preferably about 400 ml., of inert solvent, and that the mixture is subsequently warmed to 30–50° C. for 1–3 hours, preferably about 2 hours. The isolation of the compound IV, which need not be further purified, is carried out in the usual manner.

According to the other method of execution, hydrogenation is carried out with noble metal catalysts, such as palladium or platinum, with hydrogenation catalysts, such as nickel, which may optionally be partly poisoned, in organic solvents until the calculated amount or hydrogen has been taken up.

In addition, the catalyst may also be employed when precipitated onto carrier materials such as, e.g., active charcoal or calcium carbonate. The partial poisoning of the catalyst—whether employed alone or when precipitated onto a carrier material—can be carried out with lead (cf. "Lindlar-catalyst") or with organic bases such as quinoline. Non-polar or polar solvents, e.g. petroleum ether, benzene, toluene, ether, methanol, or ethanol can be employed for hydrogenation.

According to the preferred method of execution, 0.1 mole of $\beta$-hydroxy-acetylene-acetal (V) are hydrogenated as a 5–20%, preferably a 10%, solution in a hydrogenation apparatus in the presence of 1–4 parts by weight, preferably 2 parts by weight, of 3–10%, preferably of 5%, palladium-carrier catalyst, optionally poisoned with 0.1–2 parts by colume, preferably 0.5 part by volume, of quinoline. Operation is preferably carried out at room temperature, and the hydrogenation is terminated after the calculated amount of hydrogen has been taken up. Working up can be effected by the method that the catalyst is filtered off from the solution, an inert solvent, e.g. ether or petroleum ether, is added to the filtrate, and the basic constituents are removed from this mixture by a dilute inorganic acid, e.g. sulphuric acid. Thereafter, it is desirable to wash until neutral, and to dry over sodium sulphate. The reaction product is obtained after evaporation of the solvent.

(5) In the fifth synthesis step, the β-hydroxyacetal (VI) is converted to vitamin-A-aldehyde.

It is alredy known from the literature that expirements whereby compounds of similar constitution to that of the compound VI according to the invention, in fact the hydroxy-compounds IX and X

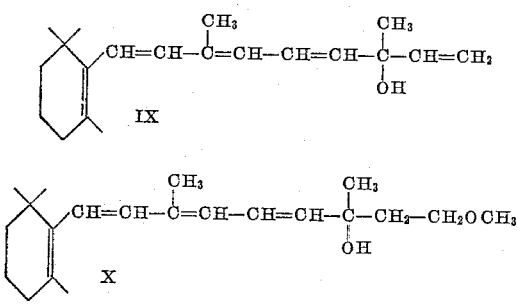

when subjected to "all common methods for rearrangement and dehydration" produced crude products with a very low biological vitamin A activity (O. Isler, Chimia 3, 150 (1949); Chimia 4, 116 (1950); cf. also Fortschritte der Chemie organisher Naturstoffe, vol. 9, Vienna 1952, p. 62). Our own experiments on the conversion of the compound X into vitamin-A-methyl ether by elimination of water indicated plainly that the compound known as retro-vitamin-A-methyl ether (XI)

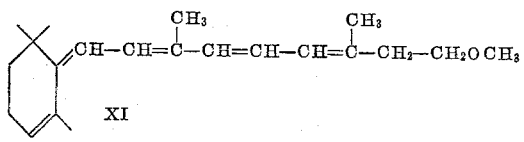

is thereby formed by manifold allyl rearrangement, which is biologically inactive. This discovery agrees with the experiences published by H. O. Huisman et al. (Recueil des Travaux chimiques des Pays-Bas 71, 911 (1952)) according to which all syntheses conducted via intermediate products which exhibit an OH group in the allyl position to the double bond of the cyclohexene ring—even via a conjugated system of double bonds—essentially produce these retro-compounds of no biological activity by retro-ionylidene-rearrangement.

It has now been found that vitamin-A-aldehyde can be prepared directly from the β-hydroxyacetal (VI) when the β-hydroxyacetal (VI) is treated with dilute aqueous inorganic acids. The resulting reaction product is free from inactive retro-vitamin-A-aldehyde, although in the compound VI employed as starting material, the hydroxy group is again located via a system of conjugated double bonds in the allyl position to the double bond of the cyclohexene ring. The special circumstance that VI constitutes a β-hydroxyacetal means that during treatment with acidic reagents, no retro-rearrangement takes place during the splitting up of the acetyl grouping, on one hand, and during elimination of water, on the other hand.

Solvents suitable for carying out the fifth step of synthesis are acyclic or alicyclic ethers such as ethylene-glycol-dimethyl ether, dibutyl ether, diisopropyl ether, dioxane, tetrahydrofuran, aliphatic ketones such as acetone, butanone-(2), pentanone-(3), esters of low aliphatic carboxylic acids such as ethyl acetate, isopropyl acetate, glycol diacetate, and furthermore also dimethylformamide.

The acidic reagents required for the reaction are aqueous inorganic acids, such as, e.g., hydrochloric acid, hydrobromic acid, sulphuric acid, or phosphoric acid.

For carrying out this step of synthesis, there is required about 5–10 times the amount of solvent for the employed β-hydroxyacetal (VI), and in addition 3–5% by volume referred to the solution, of about 1–2 normal inorganic acid; during use of phosphoric acid, it is of advantage to employ about 70–90% acid at the same molar quantity. The reaction temperature is 60–100° C., preferably about 80–90° C.; the duration of the reaction amounts to 5–30 minutes, preferably about 10–15 minutes. Isolation of the vitamin-A-aldehyde (VII) is carried out by the usual method after the reaction mixture has been introduced into ice water.

According to a preferred method of carrying out the fifth synthesis step, the β-hydroxyacetal (VI) is first dissolved in 5–10 times the amount of one of the above-specified solvents, preferably in 8–10 times the amount of dioxane. After suitable addition of an antioxidant, such as α-tocopherol acetate, hydroquinone, or phenothiazine, the solution is heated to 80–90° C. in an atmosphere of inert gas; then, 3% by volume of 2-normal hydrochloric acid are preferably added, and the reaction mixture thus prepared is preferably allowed to remain at this temperature for 10–15 minutes. Working up is carried out as indicated above.

(6) In the sixth synthesis step, the vitamin-A-aldehyde (VII) can be reduced to the vitamin-A-alcohol (VIII). Reduction is carried out by the usual methods with complex metal hydrides (cf., e.g., J. F. Arens and D. A. van Dorp, Recueil des Travaux chimiques des Pays-Bas 68, 604 (1949)) or with aluminium alcoholates according to Meerwein-Ponndorf-Verley (cf. D. A. van Dorp and J. F. Arens, Nature 160, 189 (1947); Recueil des Travaux chimiques des Pays-Bas 67, 973 (1948)). The vitamin-A-alcohol can subsequently be directly converted, in known manner, to the corresponding esters.

However, according to a preferred method of carrying out the process according to the invention, it is not necessary to isolate the vitamin-A-aldehyde (VII), but it is possible to obtain the vitamin-A-alcohol directly from the β-hydroxyacetal (VI) by a single reaction. Thereby, steps 5 and 6 of the synthesis are combined.

It has, in fact, been shown that by this method of carrying out the process, better yields can be obtained of vitamin-A-alcohol, since the isolation of the sensitive vitamin-A-aldehyde is avoided. For this purpose, the β-hydroxyacetal (VI) is converted to the vitamin-A-aldehyde with dilute acids, as already described, and an aqueous solution of alkali or alkaline earth metal borohydrides, preferably of alkali metal borohydrides, is added to the same reaction solution at temperatures between −30 and +20° C., preferably between 0° and +10° C. As alkali metal borohydrides, use may be made of sodium or potassium borohydride, as alkaline earth metal borohydrides, use may be made of magnesium or calcium borohydride. Per mole of employed β-hydroxyacetal (VI), use is made of 0.5–1.5 moles, preferably of 0.8–1 mole, of alkali metal borohydride, which is allowed to react for ½ hour to 2 hours, preferably for about 1 hour; the reaction mixture is thereafter treated at a low temperature with an aqueous solution of ammonium chloride, and is worked up as usual in an atmosphere of nitrogen. The resulting vitamin-A-alcohol can be purified in a high vacuum by molecular distillation, and subsequently be converted to the corresponding esters by the usual methods.

EXAMPLES (1) 6-(2',6',6'-Trimethylcyclohexen-(1')-Yl)-4-Methyl-4-Hydroxyhexen-(5)-Yne-(1), Acetylene Carbinol (II)

(a) 183 parts by weight of zincdust which is surface activated with hot dilute hydrochloric acid, washed with water, alcohol, acetone, and ether, and dried in vacuo at 80–100° C. for 2 hours, are treated in a reaction vessel provided with a stirrer, good reflux condensation, and a tube for passing in gases, with a solution of 384 parts by weight of β-ionone in 400 parts by volume of a 1:1 mixture of absolute ether and absolute tetrahydrofuran, and also with 2 parts by weight of α-tocopherol acetate, and are heated with stirring to the reflux temperature after air has been displaced with nitrogen; now, about 1/10 of a solution of 384 parts by weight of propargyl bromide in a 1:1 mixture of 400 parts by volume of absolute ether and tetrahydrofuran is allowed to run in, whereupon a violent reaction soon ensues. At this instant, external heating is discontinued, and the solution containing the propargyl bromide is allowed to run in so that the reaction carries on constantly with slight boiling. When all the propargyl bromide has been introduced, stirring is continued for another 15 minutes to complete the reaction, the reaction mixture is cooled to 0° C., and the reaction product is decomposed by allowing a solution of ammonium chloride, saturated when cold, to enter. After the organic phase has been separated from the aqueous phase, the latter is twice more extracted by shaking with ether, and the combined organic phases are washed several times with water until their reaction is neutral. After the organic phase has been dried over ignited sodium sulphate, it is filtered off from this, and the filtrate is freed from the solvent in vacuo. There are obtained 471 parts by weight of evaporation residue as a bright yellow, thick oil which can be immediately further processed in the other reactions. To prepare a highly purified substance, the reaction product can be distilled in a molecular thin layer evaporator at 0.005 mm./Hg and 140–150° C., and there are thus obtained 405 parts by weight of a bright yellow, thickish oil: $n_D^{20}$:1.5050, $\lambda_{max}$ 233 m$\mu$ ($\epsilon$=5700); the band characteristic for α,β-unsaturated carbonyl can no longer be found in the infrared absorption spectrum.

ANALYSIS: $C_{16}H_{24}O$ (232)

|  | C | H | O |
|---|---|---|---|
| Calc., percent | 82.73 | 10.4 | 6.88 |
| Found, percent | 82.73 | 10.47 | 7.42 |

(b) In accordance with a second form of carrying out the process according to the invention, about 1/10 to 1/3 of a solution of 19.2 parts by weight of β-ionone and 16.7 parts by weight of propargyl bromide in 40 parts by volume of a 1:1 mixture of absolute ether and tetrahydrofuran are allowed to run, in an atmosphere of inert gas, onto 9.2 parts by weight of zinc dust which was pretreated just as under (a) but in addition also with a small amount of iodine, and heated with stirring until the onset of a violent reaction. The external supply of heat is now discontinued, and the reaction is maintained by gradual introduction of the residual mixture. After everything has been added, stirring is continued for another 1/4 hour to complete the reaction, it is cooled to 0° C., and the organometallic reaction product is decomposed by allowing ice cold 10% sulphuric acid to run in. The organic layer is separated from the aqueous phase, washed with sodium hydrogen carbonate solution and water till neutral, dried over sodium sulphate, and filtered; the solvent mixture is subsequently removed in vacuo. There are obtained 24 parts by weight of a bright yellow, thickish oil with refractive index $n_D^{20}$: 1.5100; the I.R. spectrum no longer exhibits a band characteristic for α,β-unsaturated carbonyl. Distillation in a high vacuum yielded the acetylene carbinol (II) with the physical and analytical data already mentioned under (a).

(2) 6 - 2',6',6' - Trimethylcyclohexen - (1') - Yl) - 4-Methylhexadien-(3,5)-Yne-(1), Acetylene Hydrocarbon $C_{16}H_{22}$ (III)

(a) 404 parts by weight of the acetylene carbinol (II), dissolved in 1000 parts by volume of absolute benzene, are introduced into a vessel fitted with a very efficient stirrer, reflux condenser, and a tube for passing in gases, treated with 2 parts by weight of α-tocopherol acetate as well as 320 parts by weight of distilled quinoline, is cooled to −10° C. with stirring and in an inert gas atmosphere. A solution of 298 parts by weight of arsenic trichloride in 800 parts by volume of absolute benzene is now added dropwise, the reaction mixture is melted to room temperature after the introduction of all the arsenic trichloride, and the mixture is thereafter heated under reflux for two hours. After cooling, the contents of the vessel are treated with ether, and filtered by suction from solid constituents. The filter cake is rinsed with ether, then washed with ice water and dilute sulphuric acid for the removal of basic constituents, and also with ice water, sodium hydrogen carbonate solution, and ice water until neutral. All operations should preferably be carried out in an atmosphere of inert gas with exclusion of air. After drying the resulting solution over sodium sulphate, filtration, and evaporation of the solvent mixture in vacuo, there are obtained 370 parts by weight of a relatively thinly liquid oily substance, which is distilled at 0.003 mm./Hg and 140° C. in a molecular thin layer evaporator. There are thus obtained 290 parts by weight of a bright yellow, non-viscous, oily substance which darkens rapidly, particularly in light, and which can be directly employed for further synthesis. However, the distillate may also be taken up in 290 parts by volume of low boiling petroleum ether, and the solution is then quickly cooled to −50° C.; when the wall of the vessel is rubbed with a glass rod, a crystal mass soon separates from the solution, and this is allowed to deposit during several hours. After filtering by suction and washing with a little petroleum ether cooled to a low temperature, there are obtained 37 parts by weight of 6-(2',6',6'-trimethylcyclohexen-(2')-ylidene)-4-methylhexen-(4)-yne-(1) (retro-$C_{16}$-hydrocarbon IV) of melting point 51° C. Its ultraviolet absorption spectrum shows $\lambda_{max}$ 283 m$\mu$ ($\epsilon$=47,000) with inflexions at 294 m$\mu$ and 274 m$\mu$ ($\epsilon$=34,000 and 37,000). The infrared absorption spectrum exhibits the absorption at 2120 cm.$^{-1}$ characteristic for the α,β-saturated C≡C bond, and also the absorption at 3300 cm.$^{-1}$ characteristic for the C≡CH group.

ANALYSIS: $C_{16}H_{22}$ (214)

|  | C | H |
|---|---|---|
| Calc., percent | 89.65 | 10.35 |
| Found, percent | 89.48 | 10.37 |

The filtrate from the retro-$C_{16}$-hydrocarbon is freed from petroleum ether in vacuo, whereupon 250 parts by weight of the acetylene hydrocarbon (III) are obtained as a dark yellow thinly liquid oil: $n_D^{20}$:1.5569; $\lambda_{max}$:283 m$\mu$ ($\epsilon$=20,000). The infrared absorption spectrum exhibits the absorption at 2080 cm.$^{-1}$ characteristic for the α,β-unsaturated C≡C group, the absorption at 3300 cm.$^{-1}$ characteristic for the C≡CH group, and also the absorption at 965 cm.$^{-1}$ characteristic for the symmetrically disubstituted

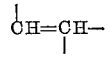

trans-ethylene bond.

ANALYSIS: $C_{16}H_{22}$ (214)

|  | C | H |
|---|---|---|
| Calc., percent | 89.65 | 10.35 |
| Found, percent | 89.01 | 10.42 |

(b) According to another method of execution, the elimination of water from the acetylene carbinol (II) can be carried out, e.g., with phosphorus oxychloride and a tertiary base. For this purpose, 0.5 part by weight of phenothiazine are added to a solution of 181 parts by weight of the acetylene carbinol (II) and 200 parts by weight of absolute pyridine in 500 parts by volume of absolute benzene, it is cooled to 0° C. with stirring in an atmosphere of inert gas, and a solution of 120 parts by weight of phosphorus oxychloride in 400 parts by volume of absolute benzene is added dropwise; the reaction mixture is allowed to melt, it is thereafter heated under a reflux condenser for 2 hours, and the cold reaction mixture is decomposed with ice water. After separation of the organic phase, this is washed with dilute sulphuric acid, water, sodium hydrogen carbonate solution, and water till neutral; after drying over sodium sulphate, it is filtered, the solvent is evaporated off in vacuo, and thus there are obtained 165 parts by weight of a thinly liquid dark oil which is distilled in a molecular thin layer evaporator. The bright yellow distillate is dissolved in an equal volume of petroleum ether and cooled to below 0° C. 35 parts by weight of the retro-hydrocarbon $C_{16}H_{22}$ (IV) of melting point 51° C. crystallise out, whilst after suction filteration of this hydrocarbon the petroleum ether mother liquor, on careful evaporation of the petroleum ether in vacuo, leaves 100 parts by weight of the acetylene hydrocarbon (III), $n_D^{20}$:1.5569, with all the properties of the hydrocarbon (III) described under (a).

(3) 9-(2',6',6'-Trimethylcyclohexen-(1')-Yl)-3,7-Dimethyl - 1,1 - Dimethoxy-3-Hydroxy-Nonadien-(6,8)-Yne-(4); β-Hydroxy-Acetylene-Acetal (V)

A solution of ethyl magnesium bromide is prepared from 46 parts by weight of magnesium filings and a small amount of iodine, covered with 250 parts by volume of absolute ether, and also 204 parts by weight of ethyl bromide dissolved in 500 parts by volume of absolute ether. When almost all of the magnesium has dissolved, it is cooled to 0° C., and a solution of 330 parts by weight of the acetylene hydrocarbon (III) in 500 parts by volume of absolute ether is added dropwise; thereafter, it is melted with stirring, whereupon an intense evolution of ethane can be noticed with spontaneous heating, and slight boiling. After the reaction has subsided, the mixture is heated under reflux for another 2 hours, again cooled to 0° C., and a solution of 275 parts by weight of 1,1-dimethoxy-butanone-(3) (freshly distilled) in 450 parts by volume of absolute ether is added dropwise, with intense stirring. An egg-yellow precipitate soon separates which is stored at 0° C. for 2 hours, and overnight at +10° C. in an atmosphere of inert gas. The following morning, the reaction mixture is cooled to 0 to −5° C., and decomposed with a solution of ammonium chloride, saturated when cold. The organic phase separated from it is dried after washing until neutral, the solvent is removed in vacuo, and there are thus obtained 440 parts by weight of a thick oil, which is freed from slight volatile portions in a molecular thin layer evaporator at 90 to 100° C. and 0.001 mm./Hg. The major amount of the β-hydroxyacetylene-acetal (V) can be distilled very readily in a thin layer evaporator at 0.001 mm./Hg and 170 to 180° C.; $n_D^{20}$:1.5320.

The main absorption in the ultraviolet absorption spectrum is at 287 mμ(ε=17,000). The infrared spectrum exhibits the OH-band at 3450 cm.$^{-1}$, the absorption at 2190 cm.$^{-1}$ characteristic for the disubstituted —C≡C— grouping, the absorption at 963 cm.$^{-1}$ characteristic for the symmetrically disubstituted

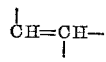

trans-ethylene bond, and also bands at 1185 cm.$^{-1}$, 1118 cm.$^{-1}$, 1070 cm.$^{-1}$ and 1042 cm.$^{-1}$ which lie in the ranges characterisitic for aliphatic acetals.

ANALYSIS: $C_{22}H_{34}O_3$

|  | C | H | O |
| --- | --- | --- | --- |
| Calc., percent | 76.26 | 9.89 | 13.85 |
| Found, percent | 76.45, 76.75 | 9.25, 9.55 | 14.38 |

(4) 9 - (2',6',6' - Trimethylcyclohexen-(1')-Yl)-3,7-Dimethyl - 3-Hydroxy-1,1-Dimethoxy-Nonatriene-(4,6,8), β-Hydroxyacetal (VI)

40 parts by weight of lithium aluminum hydride in 100 parts by volume of absolute ether are admitted into a stirrer apparatus and cooled to −10° C.; a solution of 400 parts by weight of 9-(2',6',6'-trimethylcyclohexen-(1')-yl-3,7-dimethyl-3-hydroxy - 1,1 - dimethoxy-nonadien-(6,8)-yne-(4) (β-hydroxy-acetylene-acetal (V)) in 1500 parts by volume of absolute ether are allowed to drop into this solution, and after everything has been introduced, the reaction mixture is heated to boiling for 1½ hours. After cooling to −10° C., the reaction mixture is carefully decomposed with an ether solution of diethyl acetate and thereafter with a saturated aqueous solution of ammonium chloride. The separated ether solution is subsequently washed with water until neutral, dried over sodium sulphate, and freed from solvent in vacuo. There remain 381 parts by weight of the β-hydroxyacetal (VI) which for further purification are then filtered through a short column of neutral aluminium oxide deactivated with 3% of water; after evaporation of the solvent, there is obtained a thickish oil with refractive index $n_D^{20}$:1.5433; on distilling the crude product in a molecular thin layer evaporator at 0.001 mm./Hg and 160 to 170° C., a product of the same purity is obtained. The compound exhibits a maximum at 287 mμ

(ε=24,000)

in the ultraviolet spectrum, whilst the infrared spectrum no longer shows the absorption ascribable to the disubstituted C C-grouping

ANALYSIS: $C_{22}H_{36}O_3$ (348.5)

|  | C | H | O |
| --- | --- | --- | --- |
| Calc., percent | 75.82 | 10.41 | 13.77 |
| Found, percent | 75.54, 75.25 | 10.19, 10.26 | 14.42, 14.52 |

(5) 9-(2',6',6' - Trimethylcyclohexen - (1')-Yl)-3,7-Dimethyl Nonatetraen-(2,4,6,8)-Al-(1), Vitamin-A-Aldehyde (VII)

57 parts by weight of the β-hydroxyacetal (VI) are dissolved in 250 parts by volume of dioxane, treated with 1 part by weight of phenothiazine, and heated to boiling whilst being stirred in an atmosphere of inert gas; now, a mixture of 17 parts by volume of 2 N hydrochloric acid and 50 parts by volume of dioxane are allowed to run in quickly, and the reaction solution is kept under reflux for 5 minutes. After rapid cooling, the reaction mixture is diluted with ether, the ether solution is washed with sodium hydrogen carbonate solution and water until neutral, dried over sodium sulphate, and filtered under nitrogen. Then, the solvent is carefully evaporated. There remain 43 parts by weight of crude vitamin-A-aldehyde (VII) which on distillation in a high vacuum at 0.001 mm./Hg and 140 to 160° C. yield 35 parts by weight of pure vitamin-A-aldehyde as an oil of intensive orange-yellow colour; $λ_{max}$: 377 mμ (ε=33,000). The infrared absorption spectrum exhibits characteristic bands at 1572 cm.$^{-1}$ (C=C bonds conjugated with the carbonyl group) and at 962 cm.$^{-1}$ (Symmetrically disubstituted

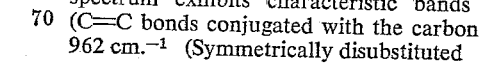

transethylene bond).

Analysis: $C_{20}H_{28}O$ (284)

|  | C | H |
|---|---|---|
| Calc., percent | 84.45 | 9.92 |
| Found, percent | 84.01 | 9.50 |

PHENYL SEMICARBAZONE OF VITAMIN-A-ALDEHYDE

The vitamin-A-aldehyde, described above, on warming with phenyl-semicarbazide in alcoholic solution gives an orange yellow phenyl-semicarbazone which after recrystallisation from ethanol exhibits a decomposition point of 196° C. The absorption maxima in the UV spectrum lie at 370 mµ, 277 mµ, and 233 mµ (ε=62,000; 10,600; 22,000).

Analysis: $C_{27}H_{35}ON_3$ (417.6)

|  | C | H |
|---|---|---|
| Calc., percent | 77.65 | 8.44 |
| Found, percent | 77.62 | 8.61 |

(6) *Vitamin-A-Alcohol*

A suspension of 13 parts by weight of lithium aluminum hydride in 500 parts by volume of absolute ether are allowed to run at −10° C. into a solution of 91 parts by weight of vitamin-A-aldehyde (VII) in 400 parts by volume of absolute ether. After being stirred at −10° C. for 1 hour and at 0° C. for another hour, it is again cooled to −10° C., excess lithium aluminium hydride is destroyed by careful addition of ethyl acetate and an aqueous solution of ammonium chloride, and after being separated the ether phase is washed with water until neutral. After drying over sodium sulphate, the solvent is evaporated in vacuo. As residue, there remains vitamin-A-alcohol, which can be passed onto its final application directly or after further purification.

(7) *Vitamin-A-Acetate*

It is convenient to convert the vitamin-A-alcohol directly to the acetate. For this purpose, the residue obtained above is dissolved under nitrogen in 400 parts by volume of absolute benzene, treated with 84 parts by volume of absolute pyridine, cooled to 0° C., and a solution of 42 parts by weight of freshly distilled acetyl chloride in 150 parts by volume of absolute benzene are allowed to run in, with stirring. It is stirred at room temperature overnight, poured onto ice the following morning, the organic phase is shaken out with dilute sulphuric acid, washed with water until neutral, and after drying freed from solvent in vacuo. There are obtained 86 parts by weight of crude vitamin-A-acetate, whose infrared spectrum agrees completely with that stated in the literature for vitamin-A-acetate. By filtration of the solution in petroleum ether through a column of aluminium oxide deactivated with 10% of water, there is obtained, on evaporation of the solvent, a very pure vitamin-A-acetate which exhibits an absorption maximum at 328 mµ (ε=45,500) in the ultraviolet spectrum.

Analysis: $C_{22}H_{32}O_2$ (328.5)

|  | C | H | O |
|---|---|---|---|
| Calc., percent | 80.44 | 9.80 | 9.74 |
| Found, percent | 80.09 | 9.75 | 10.43 |

(8) *Vitamin-$A_1$-Alcohol (Combination of Stages (5) and (6))*

A solution of 70 parts by weight of the β-hydroxyacetal(VI) in 200 parts by volume of dioxane is treated with 1.5 parts by weight of phenothiazine, and heated to boiling whilst stirring in an atmosphere of inert gas, whereupon the internal temperature amounts to 100° C. A mixture of 15 parts by volume of 2 N hydrochloric acid and 50 parts by volume of dioxane is now quickly added, the reaction mixture being heated at the boiling temperature for 5 minutes whereupon the internal temperature drops to 85° C. Now, it is cooled to 0° C., and a solution of 16 parts by weight of sodium borohydride in 150 parts by volume of 80% aqueous dioxane is allowed to run in. After stirring at 0° C. for two hours, the reaction mixture is decomposed with an aqueous solution of ammonium chloride, saturated when cold, and the organic matter is extracted by shaking several times with petroleum ether. The phase in petroleum ether is washed under nitrogen until neutral. The solution is dried over ignited sodium sulphate, filtered after addition of some active charcoal, and the solvent mixture is subsequently removed in vacuo. There remain 68 parts by weight of a thickly liquid, dark substance which for further purification is passed onto a column of aluminium oxide deactivated with 10% of water. The column is rinsed out with petroleum ether until the zone which appears darker under ultraviolet light has disappeared. Thereafter, the adsorbed vitamin-$A_1$-alcohol is eluted with ether, whereupon there are obtained 50 parts by weight of an orange-red oil with an ultraviolet absorption maximum at 325 mµ (ε=36,000). The infrared spectrum of the vitamin-$A_1$-alcohol thus obtained is identical with an infrared spectrum of vitamin-$A_1$-alcohol published in the literature (cf. C. D. Robeson, J. D. Cawley, L. Weisler, M. H. Stern, C. C. Eddinger, A. J. Chechak, Journal of the American Chemical Society 77, 4115 (1955)).

We claim:

1. Process for the production of vitamin-A-aldehyde, vitamin-A-alcohol and its acetate, which comprises that
   during the first step β-ionone (I) is reacted with a propargyl halide and zinc to form the corresponding acetylene carbinol (II);
   during the second step water is eliminated from this acetylene carbinol (II) by means of an inorganic acid halide in the presence of a tertiary organic base and the isomer of the retro series (IV) is separated from the reaction product;
   during the third step the acetylene hydrocarbon (III) is converted to the β-hydroxyacetal (V) by organometallic reaction with 1,1-dialkoxybutanone-(3)
   during the fourth step the β-hydroxyacetal (V) is partially hydrogenated at the C≡C triple bond to the β-hydroxyacetal compound (VI),
   during the fifth step the partially hydrogenated β-hydroxyacetal (VI) is treated with an acidic reagent in an organic medium to yield vitamin-A-aldehyde; and
   during the sixth step the vitamin-A-aldehyde is reduced to vitamin-A-alcohol.

2. The process as claimed in claim 1, wherein the product, vitamin-A-alcohol is acetylated to vitamin-A-acetate.

No references cited.